United States Patent
Kim et al.

(10) Patent No.: US 12,075,025 B2
(45) Date of Patent: Aug. 27, 2024

(54) CAMERA TESTING DEVICE AND METHOD FOR TESTING FOCUSING CHARACTERISTIC OF CAMERA

(71) Applicant: SK hynix Inc., Icheon-si (KR)

(72) Inventors: Hun Kim, Icheon-si (KR); Jong Heon Kim, Icheon-si (KR); Woo Young Choi, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 35 days.

(21) Appl. No.: 17/940,887

(22) Filed: Sep. 8, 2022

(65) Prior Publication Data
US 2023/0116098 A1 Apr. 13, 2023

(30) Foreign Application Priority Data
Oct. 7, 2021 (KR) .................. 10-2021-0133204

(51) Int. Cl.
*H04N 17/00* (2006.01)
*G06T 7/62* (2017.01)
*H04N 23/67* (2023.01)

(52) U.S. Cl.
CPC ............. *H04N 17/002* (2013.01); *G06T 7/62* (2017.01); *H04N 23/672* (2023.01)

(58) Field of Classification Search
CPC .... H04N 23/67; H04N 23/672; H04N 23/673; H04N 23/675; H04N 17/002; H04N 23/54; H04N 23/55; G06T 7/62; G06T 5/003; G06T 7/80; G03B 43/00–02
See application file for complete search history.

(56) References Cited

U.S. PATENT DOCUMENTS

| | | | | |
|---|---|---|---|---|
| 2004/0109080 A1* | 6/2004 | Chan | ...... | H04N 23/55 348/E5.045 |
| 2015/0181108 A1* | 6/2015 | Endo | ...... | H04N 25/134 348/345 |
| 2015/0350527 A1* | 12/2015 | Hamano | ...... | H04N 23/673 348/231.99 |
| 2016/0360092 A1* | 12/2016 | Shih | ...... | H04N 23/673 |
| 2017/0090149 A1* | 3/2017 | Galor Gluskin | ..... | H04N 25/704 |

FOREIGN PATENT DOCUMENTS

KR 20090123618 A * 12/2009 ............. H04N 5/232

* cited by examiner

*Primary Examiner* — Michael E Teitelbaum
*Assistant Examiner* — Humam M Satti
(74) *Attorney, Agent, or Firm* — Perkins Coie LLP (57) ABSTRACT

A method for testing a focusing characteristic of a camera may include setting a camera to align the camera and a first chart structured to provide a first scene for testing such that the camera is focused on the first chart disposed at a first distance from the camera, measuring a blur in an image of a second chart captured at a second distance from the camera, the second chart being structured to provide a second scene for testing, and evaluating a phase difference range (PDR) of the camera based on the measured blur and a blur calculated through a circle of confusion (CoC) model.

20 Claims, 7 Drawing Sheets

CAMERA TESTING DEVICE AND METHOD FOR TESTING FOCUSING CHARACTERISTIC OF CAMERA

CROSS-REFERENCES TO RELATED APPLICATION

This patent document claims the priority and benefits of Korean application number 10-2021-0133204, filed on Oct. 7, 2021, which is incorporated herein by reference in its entirety as part of the disclosure of this patent document.

TECHNICAL FIELD

Various embodiments generally relate to a camera testing device capable of testing the characteristics of a camera.

BACKGROUND

An image sensing device is a device for capturing optical images by converting light into electrical signals using a photo-sensitive semiconductor material that reacts to light. With the recent development of various industries such as automobile, medical, computer and communication industries, the demand for high-performance image sensing devices is increasing in various devices such as a smart phone, digital camera, game machine, IOT (Internet of Things), robot, security camera and medical micro camera.

The image sensing devices may be roughly divided into a CCD (Charge Coupled Device) image sensing device and a CMOS (Complementary Metal Oxide Semiconductor) image sensing device. The CCD image sensing device provides a higher image quality than the CMOS image sensing device, but has a larger size and consumes more power than the CMOS image sensing device. On the contrary, the CMOS image sensing device has a smaller size and consumes less power than the CCD image sensing device. Furthermore, since the CMOS image sensing device is fabricated by the CMOS fabrication technology, a photo sensing element and a signal processing circuit may be integrated into a single chip, which makes it possible to fabricate a small-sized image sensing device at a low cost. For these reasons, the CMOS image sensing device is being developed for many applications including a mobile device.

SUMMARY

Various embodiments relate to a camera test device that can evaluate the focusing characteristics of various cameras.

In an embodiment, a method for testing a focusing characteristic of a camera may include setting a camera to align the camera and a first chart structured to provide a first scene for testing such that the camera is focused on the first chart disposed at a first distance from the camera, measuring a blur in an image of a second chart captured at a second distance from the camera, the second chart being structured to provide a second scene for testing, and evaluating a phase difference range (PDR) of the camera based on the measured blur and a blur calculated through a circle of confusion (CoC) model.

In another embodiment, a camera testing device may include a first chart structured to provide a first scene for testing and disposed to have a first distance from a camera, a second chart structured to provide a second scene for testing and disposed to have a second distance from the camera, and a camera tester configured to: set the camera to align the camera and the first chart such that the camera is focused on the first chart; measure a blur for the second chart; and evaluate a phase difference range (PDR) of the camera based on the measured blur and a blur calculated through a circle of confusion (CoC) model.

In another embodiment, a method for testing a focusing characteristic of a camera may include: setting a camera such that the camera is focused on a first chart disposed at a first distance from the camera; measuring a blur for a second chart disposed at a second distance from the camera; and evaluating a PDR (Phase Difference Range) of the camera on the basis of the measured blur and a blur calculated through a CoC (Circle of Confusion) model.

In an embodiment, a camera testing device may include: a first chart disposed to have a first distance from a camera; a second chart disposed to have a second distance from the camera; and a camera tester configured to set the camera such that the camera is focused on the first chart, measure a blur for the second chart, and evaluate a PDR of the camera on the basis of the measured blur and a blur calculated through a CoC model.

In some embodiments, the camera testing device may evaluate the focusing characteristic of even an FF (Fixed Focus) module, not an AF (Auto Focus) module, which makes it possible to test the focusing characteristic without burdens of the cost, the time period and the part supply and demand.

In addition, it is possible to provide various effects which are directly or indirectly understood through this document.

DETAILED DESCRIPTION

Hereafter, various embodiments will be described with reference to the accompanying drawings. However, it should be understood that the present disclosure is not limited to specific embodiments, but includes various modifications, equivalents and/or alternatives. The embodiments of the present disclosure may provide various effects which can be directly/indirectly recognized through the present disclosure.

Figure 1:
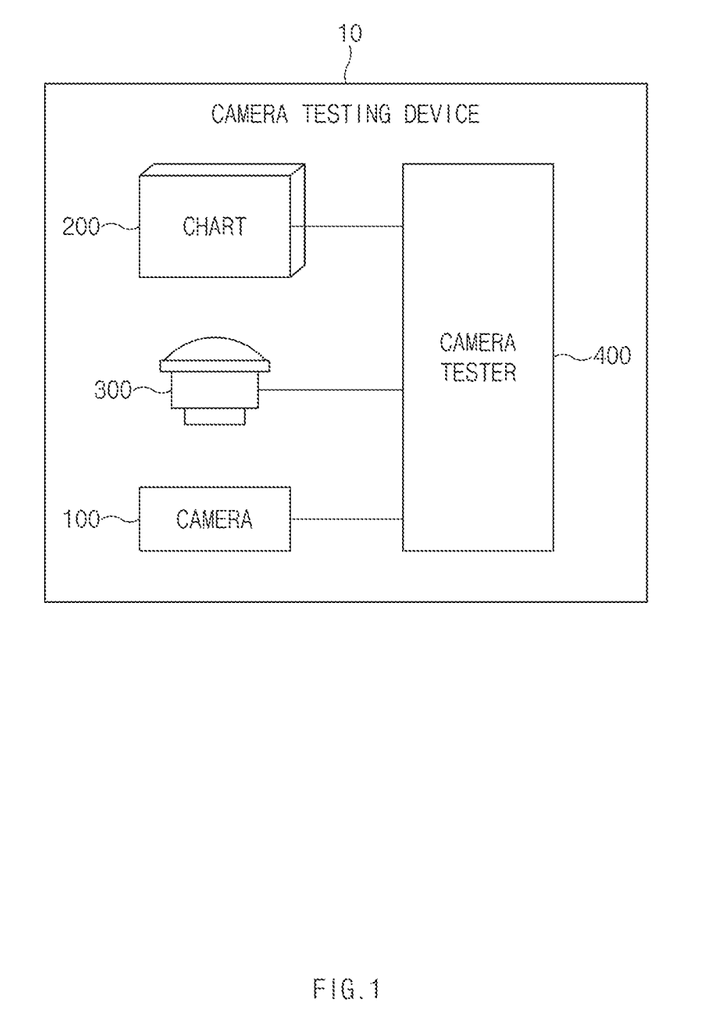
FIG. 1 is a block diagram illustrating an example of a camera testing device based on some embodiments of the disclosed technology.
Figure 2:
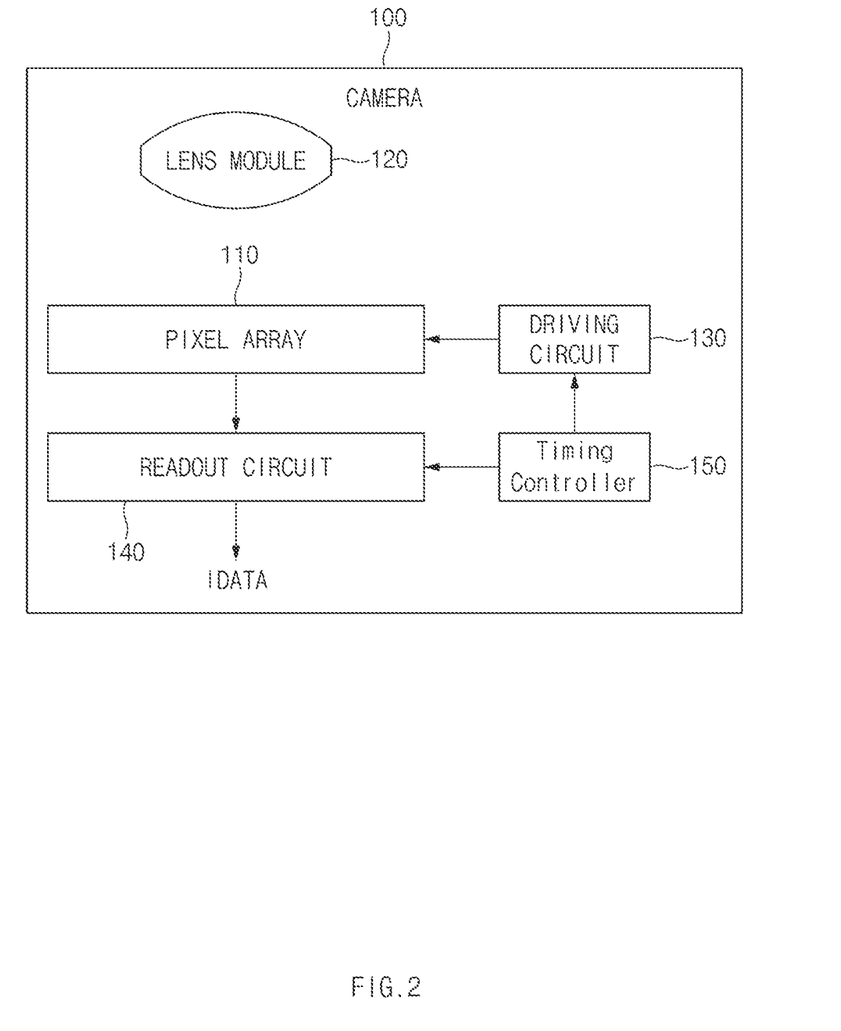
FIG. 2 is a diagram illustrating an example of a camera of FIG. 1 based on some embodiments of the disclosed technology.

FIG. 1 is a block diagram illustrating an example of a camera testing device based on some embodiments of the disclosed technology. FIG. 2 is a diagram illustrating an example of a camera of FIG. 1 based on some embodiments of the disclosed technology.

Referring to FIG. 1, a camera testing device 10 implemented based on some embodiments of the disclosed technology is used to test various characteristics (e.g., optical characteristic) of a camera 100.

In some implementations, the camera testing device 10 may include the camera 100 (or a camera holder to be connected to the camera 100), a chart 200, a collimator lens (CL) 300 and a camera tester 400.

The camera 100 is targeted for testing by the camera testing device 10. The camera 100 is mounted on the camera testing device 10 and the camera testing device 10 holds the camera 100 during the testing of the camera 100.

Examples of the camera 100 may include a digital still camera for capturing a still image and a digital video camera for capturing a video. For example, the camera 100 may be a DSLR (Digital Single Lens Reflex) camera, mirrorless camera or mobile phone (e.g., smart phone), and others. The camera 100 may include any device that has a lens and an imaging element that can generate an image by converting light of an optical image of an object into electrical signals.

In some implementations, the camera 100 may include a fixed focus (FF) module which has a fixed distance between a lens module (e.g., the illustrated lens module 120 of FIG. 2) for concentrating light from a scene or object and an image plane (e.g., light receiving surface of the pixel array 110 in FIG. 2) on which an image of the concentrated light is formed. Other camera designs may be different from the FF module design by including an auto-focus (AF) module with an actuator for moving the relative positions of the lens module 120 and the pixel array 110 to adjust the distance between the lens module and the image plane. Various actuators may be implemented, including, for example, a voice coil motor (VCM). The "fixed" distance between the lens module and the image plane in the FF module may indicate that the FF module cannot adjust camera focus, unlike the AF module.

Since the AF module includes the VCM to adjust the camera focus, a test for evaluating the focusing characteristics for the AF module is performed by moving the VCM. However, an accurate test requires the AF module to have various test-related functions as well as the VCM for auto focusing, and there may be difficulties in procuring the components (e.g., VCM) of the AF module. Thus, manufacturing the AF module (e.g., active align calibration and VCM calibration are required) can cost considerable time and money. In addition, it is difficult to test or evaluate the focusing characteristics of the camera before the components of the AF module are assembled.

However, the camera testing device 10 based on some embodiments of the disclosed technology may evaluate the focusing characteristics of the FF module instead of the AF module, thereby saving time and money that would have been spent in conducting the test using the AF module.

The focusing characteristic may indicate characteristics related to the focusing of the camera 100, such as a phase difference range (PDR), as will be discussed below.

Referring to FIG. 2, the camera 100 may include the lens module 120, a pixel array 110, a pixel driving circuit 130 and a pixel readout circuit 140.

The pixel array 110 may include a plurality of unit pixels arranged in n rows and m columns where n and m are integers equal to or greater than 2. In an embodiment, the plurality of unit pixels may be arranged in a 2D pixel array including rows and columns. In another embodiment, the plurality of unit pixels may be arranged in a 3D pixel array.

The plurality of unit pixels may generate electrical signals on a unit pixel basis or pixel group basis, and the unit pixels within each pixel group may share at least a specific internal electric circuit.

The plurality of unit pixels may each detect light passing through the lens module 120 and generate a pixel signal corresponding to the luminous intensity of the light. The pixel array 110 may receive, from the pixel driving circuit 130, a driving signal including a row selection signal, a pixel reset signal and a transmission signal, for example. The driving signal may be used to select a unit pixel of the pixel array 110 to perform an operation corresponding to the row selection signal, the pixel reset signal or the transmission signal.

The plurality of unit pixels may include image detection pixels for acquiring a color image and phase difference detection pixels for acquiring phase difference information. The image detection pixels may be arranged according to a certain rule or pattern (e.g., Bayer pattern), and each of the image detection pixels generates a pixel signal by detecting light corresponding to a specific color (e.g., red, blue or green). The phase difference detection pixels may acquire two kinds of images and detect a phase difference by calculating how much the two kinds of images are shifted from an optical axis.

For example, the pixels for acquiring two kinds of images may be implemented as paired pixels that include two adjacent pixels share one on-chip lens or as half-shield pixels that include a pixel structured to include a light shield layer disposed over one half (e.g., left half) of a light receiving region of the pixel and another pixel structured to include a light shield layer disposed over the other half (e.g., right half) of the light receiving region of the other pixel, which are arranged together in the pixel array 110.

The lens module 120 may concentrate light received from a scene and transfer the concentrated light to the pixel array 110. The lens module 120 may include one or more lenses arranged around an optical axis. The lens module 120 may have a predetermined curvature such that the pixel array 110 can detect a scene corresponding to a predetermined field of view (FOV).

As described above, the camera 100 may include or correspond to a fixed focus (FF) module. In this case, the distance between the lens module 120 and the image plane (e.g., the light receiving surface of the pixel array 110), on which an image of concentrated light is formed, may be fixed.

In some implementations, the pixel driving circuit 130 may enable the pixel array 110 to perform specific operations on the unit pixels included in the corresponding row, in response to receiving commands and control signals from a timing controller 150. In an embodiment, the pixel driving circuit 130 may select one or more unit pixels arranged at one or more rows of the pixel array 110. The pixel driving circuit 130 may generate a row selection signal to select one or more rows among a plurality of rows, according to a row address signal of the timing controller 150. The pixel driving circuit 130 may sequentially enable the pixel reset signal and the transmission signal for the pixels corresponding to the selected one or more rows. Thus, a reference signal and an image signal, which are analog signals generated through the respective unit pixels of the selected row, may be sequentially transferred to the pixel readout circuit 140. The reference signal may be an electrical signal that is provided to the pixel readout circuit 140 when a sensing node (e.g., floating diffusion node) of a unit pixel is reset, and the image signal may be an electrical signal that is provided to the pixel readout circuit 140. Such an electrical signal corresponds to photocharge generated by the unit pixel and accumulated in the sensing node. The reference signal indicates a unique reset noise of a pixel and the image signal indicates the intensity of incident light. In this patent document, the reference signal and the image signal can be referred to as a pixel signal.

The pixel readout circuit 140 may use a correlated double sampling (CDS) scheme to remove an undesired offset value of a pixel, such as a fixed pattern noise, by sampling the pixel signal twice in order to remove the difference between two samples (e.g., the reference signal and the image signal). Through the CDS, the pixel readout circuit 140 may remove the undesired offset value by comparing pixel output voltages acquired before and after photocharge generated by incident light is accumulated in the sensing node, thereby measuring a pixel output voltage based on only the incident light. In an embodiment, the pixel readout circuit 140 may sequentially sample and hold the reference signals and the image signals, which are provided to a plurality of column lines, respectively, from the pixel array 110. That is, the pixel readout circuit 140 may sample and hold the levels of the reference signal and the image signal which correspond to each of the columns of the pixel array 110.

The pixel readout circuit 140 may include an analog-to-digital converter (ADC) for converting the signal, sampled through the CDS, into a digital signal. In an embodiment, the pixel readout circuit 140 may include a ramp-compare type ADC. The ramp-compare type ADC may include a comparison circuit configured to compare an analog pixel signal to a ramp signal, which ramps up and down, and a counter configured to perform a counting operation until the voltage of the ramp signal matches the voltage of the analog pixel signal.

The pixel readout circuit 140 may include an output buffer to temporarily hold column-based image data provided from the ADC and output the held data. The output buffer may temporarily store the image data outputted from the ADC, in response to receiving a control signal of the timing controller 150. The output buffer may operate as an interface that is structured to compensate for a difference in the transmission rate (or processing speed) between the camera 100 and another device coupled thereto.

The pixel readout circuit 140 may include a column driver to select a column of the output buffer on the basis of the control signal of the timing controller 150 and sequentially output the image data temporarily stored in the selected column of the output buffer. In an embodiment, the column driver may receive a column address signal from the timing controller 150 to select a column of the output buffer on the basis of the column address signal, such that image data IDATA is outputted from the selected column of the output buffer to the outside of the camera 100.

The timing controller 150 may generate a clock signal required for the operation of each component of the camera 100, a control signal for timing control, a row address signal for selecting a row, and a column address signal for selecting a column, and provide the generated signals to the corresponding component. In an embodiment, the timing controller 150 may include a logic control circuit, a phase locked loop (PLL) circuit, a timing control circuit, a communication interface circuit and others.

Referring back to FIG. 1, the chart 200 may provide a scene that can be used for testing of the camera 100, such as the focusing characteristic of the camera 100. In one example, the "scene" provided by the chart 200 may include a scene that is created by or stored in the chart 200 for camera testing purposes. The distance between the chart 200 and the camera 100 may be adjusted by the camera tester 400.

Figure 4A:
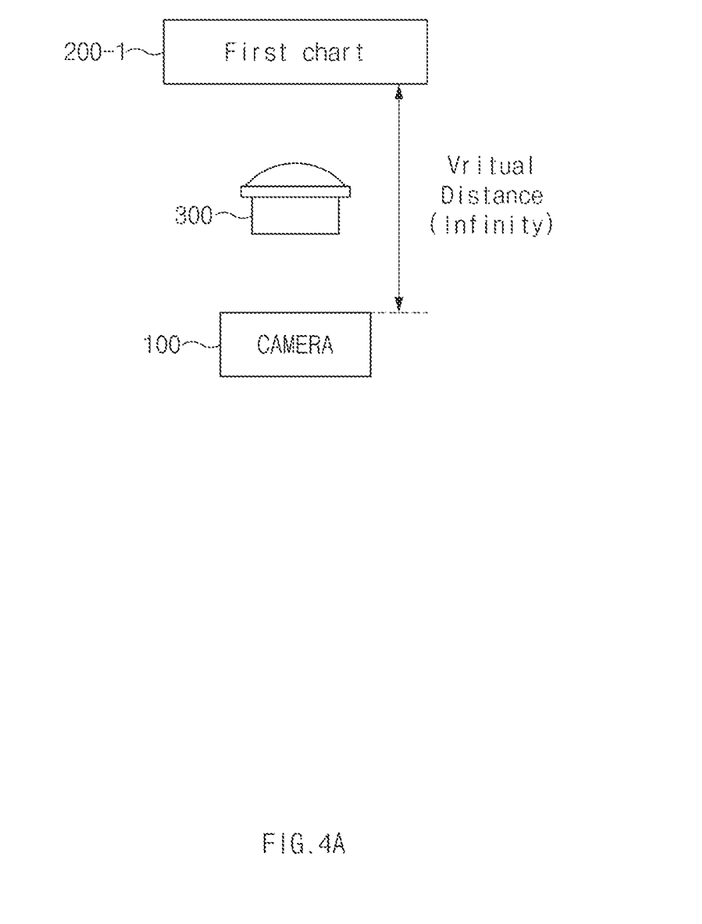
FIG. 4A illustrates an arrangement of a camera and a first chart located at an infinity position.
Figure 4B:
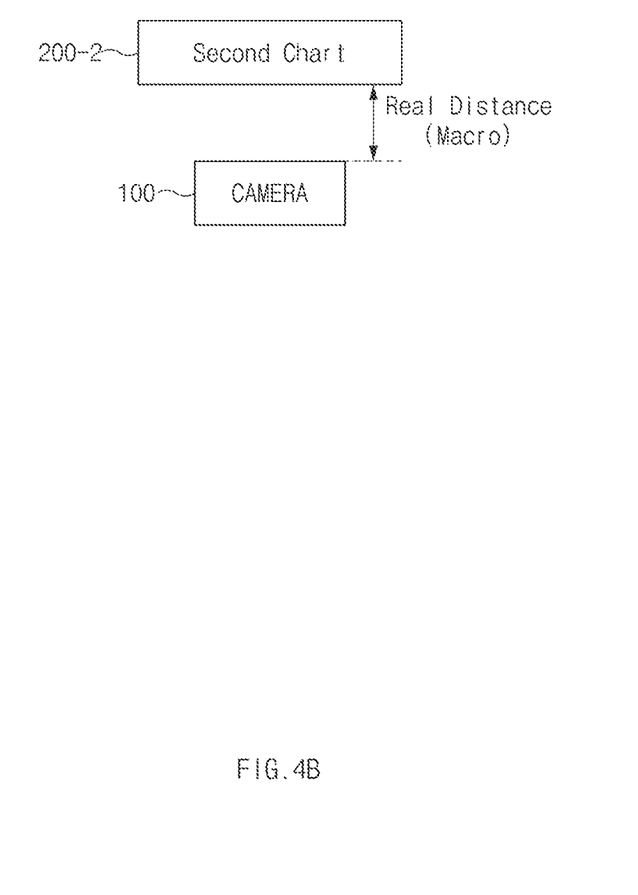
FIG. 4B illustrates an arrangement of a camera and a second chart located at a macro position.

The chart 200 may be a first chart (200-1 of FIG. 4A) or a second chart (200-2 of FIG. 4B). The first chart 200-1 and the second chart 200-2 will be described below with reference to FIGS. 4A and 4B.

The collimator lens (CL) 300 may convert the real distance between the camera 100 and the chart 200 into a virtual distance by correcting the path of light received from the chart 200. For example, even if the real distance between the camera 100 and the chart 200 is only about 20 cm, the virtual distance between the camera 100 and the chart 200 may become inn from the viewpoint of the camera 100, because the CL 300 is disposed between the camera 100 and the chart 200.

The ability of the CL 300 to convert the real distance into the virtual distance, i.e., the distance conversion performance may be determined based on the performance of the CL 300 and the distance between the chart 200 and the CL 300. The distance conversion performance may be calculated and stored by the camera tester 400 in advance, and the camera tester 400 may adjust the positions of the chart 200 and the CL 300 by referring to the distance conversion performance, such that the camera 100 and the chart 200 have a necessary virtual distance therebetween.

The camera tester 400 may test an optical characteristic of the camera 100, or specifically the focusing characteristic, and control the camera 100, the chart 200, and the CL 300 in order to perform the test. Example operations of the camera tester 400 will be described below with reference to FIG. 3 and the following drawings.

Figure 3:
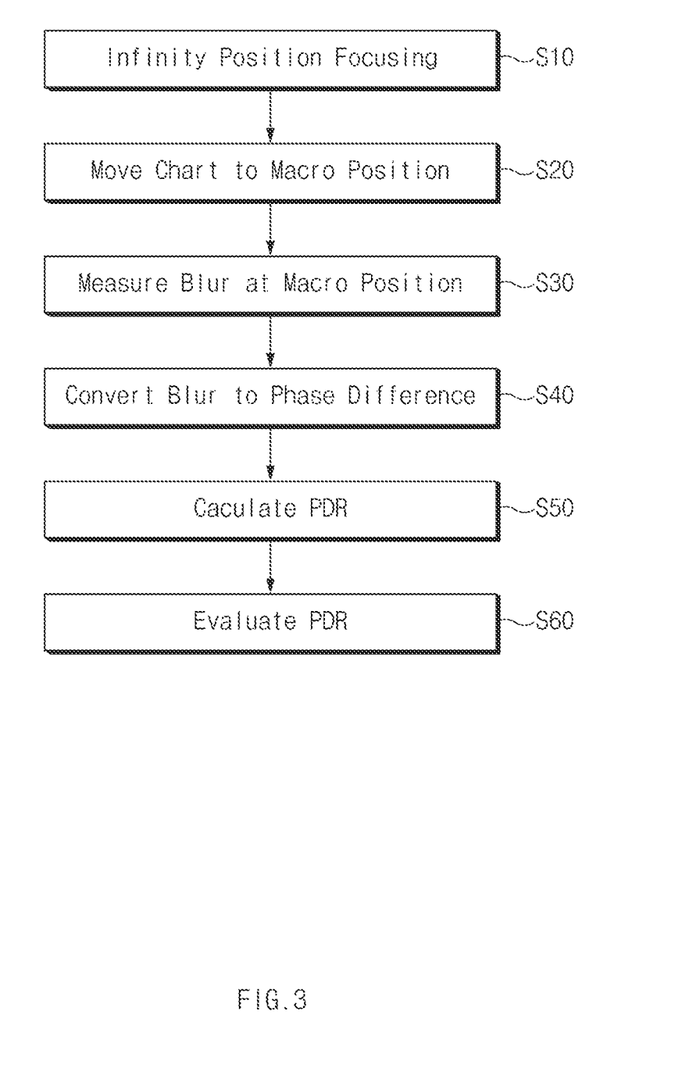
FIG. 3 is a flowchart illustrating an example of a testing method for focusing characteristics of a camera using the camera testing device based on some embodiments of the disclosed technology.
Figure 5:
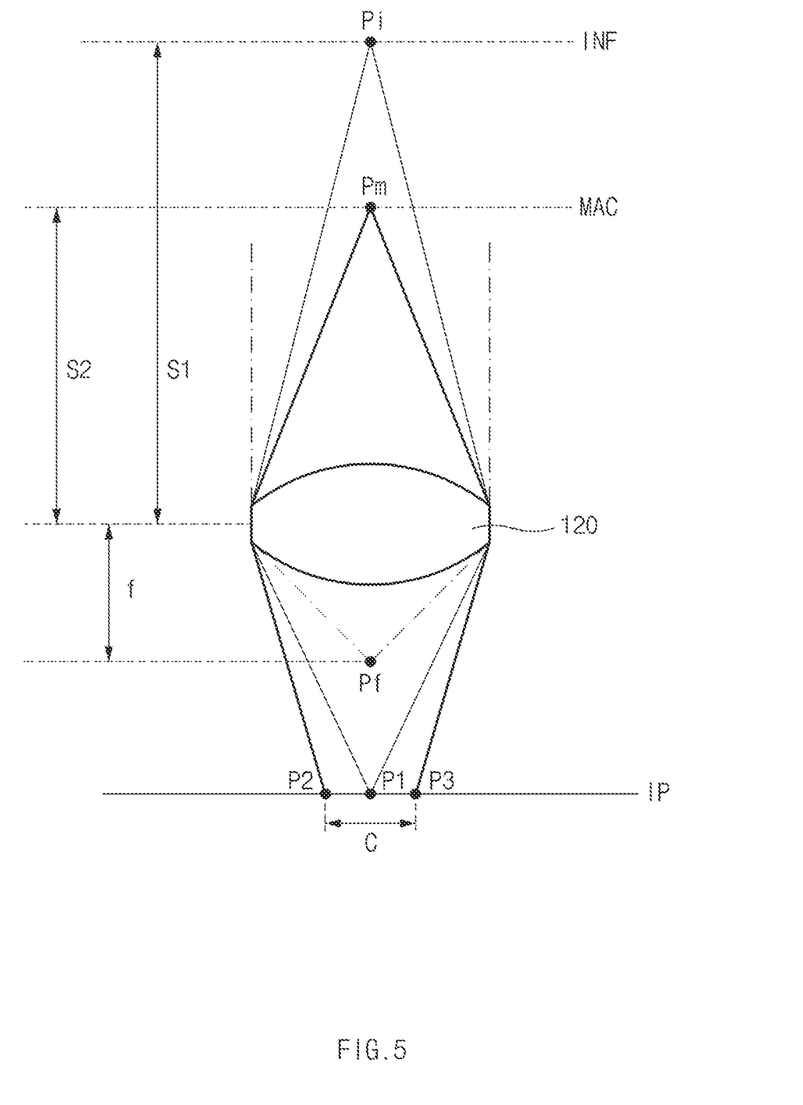
FIG. 5 illustrates a circle of confusion (CoC) model for theoretically calculating the diameter of a blur circle.
Figure 6:
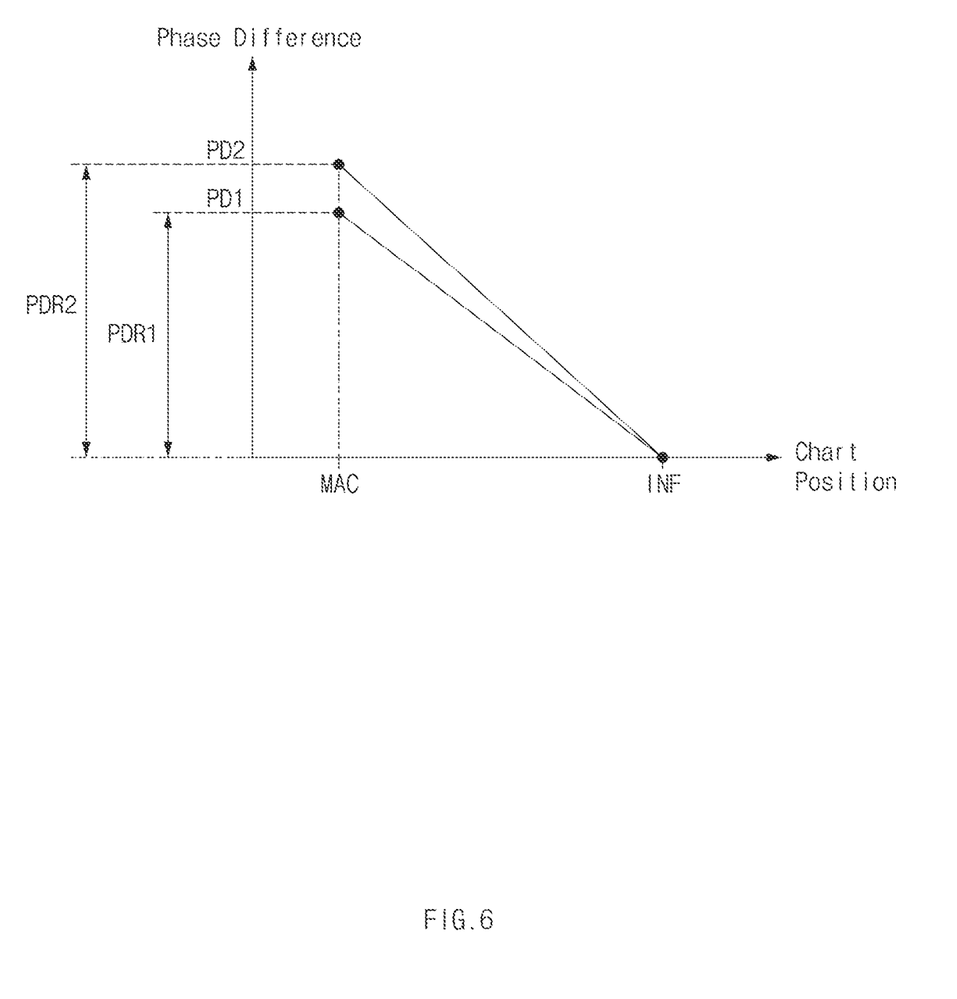
FIG. 6 illustrates a method for calculating a phase difference range (PDR).

FIG. 3 is a flowchart illustrating an example of a testing method for focusing characteristics of a camera using the camera testing device based on some embodiments of the disclosed technology. FIG. 4A illustrates an arrangement of a camera and a first chart, which have an infinity distance therebetween. FIG. 4B illustrates an arrangement of the camera and a second chart, which have a macro distance therebetween. FIG. 5 illustrates a circle of confusion (CoC) model for theoretically calculating the diameter of a blur circle. FIG. 6 illustrates a method for calculating a phase difference range (PDR).

Referring to FIG. 3, the camera tester 400 may set the camera 100 to adjust the focus to the camera 100 focused on the first chart 200-1 disposed at an infinity position corresponding to an infinity distance, at S10. The infinity distance may be a predetermined evaluation distance required by a user of the camera 100.

At S10, the chart 200 is the first chart 200-1. The first chart 200-1 may provide a first scene that is suitable for more easily determining whether the camera 100 is focused to the chart 200 (in-focus). For example, the first chart 200-1 may be a spatial frequency response (SFR) chart, edge SFR (eSFR) chart, line chart, or television (TV) lines chart. Here, the word "in-focus" may indicate that light from object points is converged almost as much as possible in the image. For example, a focal point, onto which collimated light parallel to the axis is focused, coincides with the image plane.

Referring to FIG. 4A, the camera tester 400 may adjust the positions of the first chart 200-1 and the CL 300 such that the distance between the camera 100 and the first chart 200-1 becomes the infinity distance. Then, the camera tester 400 may adjust a setting of the camera 100 such that the camera 100 is focused on the first chart 200-1 at the position corresponding to the infinity distance. The setting of the camera 100 may include a setting (or aligning) for adjusting the distance between the lens module 120 and the pixel array 110. Since the camera 100, which is a fixed focus (FF)

module, includes no voice coil motor (VCM), the distance between the lens module 120 and the pixel array 110 is not automatically adjustable, but may be manually or mechanically adjusted (e.g. manual screw adjustment).

The camera tester 400 may operate the camera 100 to acquire the image data IDATA while adjusting the distance between the lens module 120 and the pixel array 110. In addition, the camera tester 400 may analyze the image data IDATA to determine the distance between the lens module 120 and the pixel array 110, at which the camera 100 is focused on the first chart 200-1. Here, whether the camera 100 is focused on the first chart 200-1 may be determined according to whether the contrast of the image data IDATA is maximized. That is, the camera tester 400 may search for the distance between the lens module 120 and the pixel array 110, at which the contrast of the image data IDATA is maximized, and fix the lens module 120 at the position where the contrast of the image data IDATA is maximized. Therefore, when the setting is completed at S10, the camera 100 may adjust the focus to the first chart 200-1 at the infinity position corresponding to the infinity distance.

Referring back to FIG. 3, the camera tester 400 may move the chart 200 to a macro position corresponding to a macro distance, at S20. The macro distance may be a predetermined evaluation distance requested by a user of the camera 100. In one example, the macro distance may have a smaller value than the infinite distance.

After S20, the chart 200 is the second chart 200-2. The second chart 200-2 may provide a second scene that is suitable for more easily measuring the degree of blur which occurs when the camera 100 is out of focus. For example, the second chart 200-2 may be a diamond chart, vine chart, stripe chart, or checker chart.

In another embodiment, as the procedure proceeds from S10 to S20, the type of the chart 200 is not changed from the first chart 200-1 to the second chart 200-2, but one of the charts 200-1 and 200-2 may be continuously used.

Referring to FIG. 4B, the camera tester 400 may adjust the position of the second chart 200-2 such that the distance between the camera 100 and the second chart 200-2 becomes the macro distance. The macro distance may be a distance (e.g., 10 cm) that may be implemented as the real distance between the camera 100 and the second chart 200-2 without the CL 300. As illustrated in FIG. 4B, the CL 300 may not be disposed between the camera 100 and the second chart 200-2. In another embodiment, when the macro distance exceeds the distance which may be implemented as the real distance between the camera 100 and the second chart 200-2, the CL 300 may be disposed between the camera 100 and the second chart 200-2 unlike the configuration illustrated in FIG. 4B.

Referring back to FIG. 3, the camera tester 400 may measure blur indicating how much the camera 100 is out of focus with the second chart 200-2 disposed at the macro distance from the camera 100, at S30.

In some implementations of the disclosed technology, a calculation associated with a theoretical blur using a circle of confusion (CoC) model can be performed as will be discussed below.

FIG. 5 illustrates the path along which light rays emitted from one point Pi of the first chart 200-1 disposed at the infinity position INF are transferred to the image plane IP of the camera 100 through the lens module 120 of the camera 100. Since the camera 100 is focused on the first chart 200-1 at the infinity position INF (in-focus), the light rays emitted from one point Pi of the first chart 200-1 may converge to a first point P1 of the image plane IP. Suppose that no blur occurs while the camera 100 is in-focus.

FIG. 5 also illustrates the path along which light rays emitted from one point Pm of the second chart 200-2 disposed at the macro position MAC are transferred to the image plane IP of the camera 100 through the lens module 120 of the camera 100. Since the focal point of the light rays emitted from the one point Pm of the second chart 200-2 disposed at the macro position MAC is located before the image plane IP (i.e., back focal state), the light rays emitted from the one point Pm of the second chart 200-2 may be incident onto a second point P2 and a third point P3 of the image plane IP. Since the image plane IP is a plane corresponding to the pixel array 110, the shape in which the light rays emitted from the one point Pm of the second chart 200-2 are incident on the image plane IP may correspond to a circle on the plane. As such, a circle that occurs on the image plane IP due to the out-of-focus may be defined as a blur circle. As the state that the camera 100 is out of focus becomes more severe, a diameter c of the blur circle may increase.

The diameter c of the blur circle may be calculated by Equation 1 below:

$$c = \frac{|S2 - S1|}{S2} \times \frac{f}{S1 - f} \qquad \text{(Eq. 1)}$$

where S1 is a first distance, S2 is a second distance, and f is a focal point.

In Equation 1, the first distance S1 may indicate the distance between the infinity position INF and the center of the lens module 120 (or the distance between the first chart 200-1 and the camera 100), and the second distance S2 may indicate the distance between the macro position MAC and the center of the lens module 120 (or the distance between the second chart 200-2 and the camera 100).

The focal distance f indicates the distance between the center of the lens module 120 and a point Pf at which light rays incident vertically on the camera 100 at both ends of the lens module 120 pass through the lens module 120 and then meet. The focal distance f may be predetermined according to the characteristic (e.g., curvature) of the lens module 120.

That is, when the first distance S1, the second distance S2 and the focal distance f are determined, the diameter c of the blur circle may be theoretically calculated. The arithmetically calculated diameter of the blur circle may be defined as a first diameter c. However, a second diameter c' which is the diameter of the blur circle measured by the camera 100 may be different from the theoretically calculated diameter c of the blur circle due to various factors (e.g., alignment error of the lens module 120).

Referring back to FIG. 3, the camera tester 400 may extract a blur circle from the image data IDATA of the camera 100 having imaged the second chart 200-2 disposed at the macro position MAC, and measure the diameter of the extracted blur circle, in order to measure the blur, at S30. The actually measured diameter of the blur circle may be defined as the second diameter c'. Here, the blur may indicate the diameter of the blur circle.

The first diameter c of the blur circle, which has been theoretically calculated, may be converted into a first phase difference. The first phase difference may be a value obtained by theoretically calculating how much light rays emitted from the one point Pm at the macro position MAC are spaced apart from each other on a pixel basis, when incident on the image plane IP through the lens module 120. In an embodiment, the first phase difference may correspond to a value obtained by dividing the first diameter c of the blur circle by the width of one pixel included in the pixel array 110. In some embodiments of the disclosed technology, it is assumed that the plurality of pixels included in the pixel array 110 have the same width.

The camera tester 400 may convert the second diameter c' of the blur circle, which has been actually measured, into a second phase difference, at S40. The second phase difference may be a value obtained by actually measuring how much light rays emitted from the one point Pm at the macro position MAC are spaced apart from each other on a pixel basis, when incident on the image plane IP through the lens module 120. In an embodiment, the camera tester 400 may calculate the second phase difference by dividing the second diameter c' of the blur circle by the width of one pixel included in the pixel array 110.

Referring to FIG. 6, a phase difference range (PDR) in some embodiments of the disclosed technology may indicate the range from the minimum phase difference to the maximum phase difference. As the chart 200 is moved from the infinity position INF to the macro position MAC, the phase difference may gradually increase. The minimum phase difference may indicate a phase difference corresponding to a blur for the first chart 200-1 located at the infinity position INF. The maximum phase difference may indicate a phase difference corresponding to a blur for the second chart 200-2 located at the macro position MAC.

The phase difference corresponding to a blur for the first chart 200-1 located at the infinity position INF may be set so that the camera 100 is focused on the first chart 200-1 located at the infinity position INF, and thus the phase difference corresponding to a blur for the first chart 200-1 located at the infinity position INF may correspond to 0.

In some implementations, a first PDR PDR1 may be calculated based on a first phase difference PD1 calculated above. The first PDR PDR1 may indicate a PDR corresponding to the case in which the first phase difference PD1 is theoretically acquired, and thus the first PDR PDR1 may correspond to a difference between the first phase difference PD1 as the maximum phase difference and 0 as the minimum phase difference. Therefore, the first PDR PDR1 may have the same value as the first phase difference PD1.

The camera tester 400 may calculate a second PDR PDR2 on the basis of a second phase difference PD2. The second PDR PDR2 may indicate a PDR corresponding to the case in which the second phase difference PD2 is acquired through actual measurement, and thus the second PDR PDR2 may correspond to a difference between the second phase difference PD2 as the maximum phase difference and 0 as the minimum phase difference. Therefore, the second PDR PDR2 may have the same value as the second phase difference PD2.

In an embodiment, the first diameter c of the blur circle, the first phase difference PD1 and the first PDR PDR1 may be previously calculated by the camera tester 400 before the test is performed on the camera 100, and stored in the camera tester 400.

The camera tester 400 may evaluate the PDR of the camera 100 according to the comparison result between the first PDR PDR1 and the second PDR PDR2, at S60. As illustrated in FIG. 6, when the second PDR PDR2 exceeds the first PDR PDR1, the camera tester 400 may evaluate that the PDR of the camera 100 has passed. On the contrary, when the second PDR PDR2 is less than the first PDR PDR1, the camera tester 400 may evaluate that the PDR of the camera 100 has failed.

This is because, only when the second PDR PDR2 based on the value actually measured through the camera 100 is larger than the first PDR PDR1 based on the theoretically calculated value, it is possible to provide a design margin during a subsequent process (e.g., VCM mounting) on the camera 100.

Furthermore, in some implementations, steps S40, S50 and S60 are included in the step of evaluating the PDR of the camera 100 on the basis of the blur c' actually measured at S30 and the blur c calculated through the CoC model.

The method of testing the camera 100 based on some embodiments of the disclosed technology may acquire a PDR for a camera having no VCM mounted therein, thereby reducing the cost and time required for acquiring the PDR.

In some embodiments of the disclosed technology, the PDR of the camera 100 is evaluated by: setting the camera 100 such that the camera 100 is focused on the chart 200 at the infinity position INF, and acquiring the PDR by measuring a blur at the macro position MAC. However, the disclosed technology is not limited thereto. In another embodiment of the disclosed technology, the PDR of the camera 100 may be evaluated by: setting the camera 100 such that the camera 100 is focused on the chart 20 at the macro position MAC, and acquiring the PDR by measuring a blur at the infinity position INF.

While various embodiments have been described above, it will be understood the disclosed embodiments are merely examples of certain implementations. Accordingly, various modifications of the camera testing device described herein and other embodiments can be made based on what is disclosed and/or illustrated in this patent document.

What is claimed is:

1. A method for testing a focusing characteristic of a camera, the method comprising:
   setting a camera to align the camera and a first chart structured to provide a first scene for testing such that the camera is focused on the first chart disposed at a first distance from the camera;
   measuring a blur in an image of a second chart captured at a second distance from the camera, the second chart being structured to provide a second scene for testing; and
   evaluating a phase difference range (PDR) of the camera by comparing the measured blur with a blur calculated through a circle of confusion (CoC) model,
   wherein the PDR indicates a range from a minimum phase difference to a maximum phase difference.

2. The method of claim 1, wherein the first distance is an infinity distance, and the second distance is a macro distance, and wherein the first distance has a larger value than the second distance.

3. The method of claim 1, wherein the camera is a fixed focus module that is configured without a voice coil motor.

4. The method of claim 1, wherein the camera comprises:
   a lens module structured to concentrate light received from the first scene or the second scene; and
   a pixel array including a plurality of pixels and an image plane, wherein each pixel is configured to detect light transferred from the lens module, and wherein the light is incident on the image plane.

5. The method of claim 4, wherein the setting of the camera comprises:

determining whether the camera is focused on the first chart, by analyzing image data generated by the camera; and adjusting the distance between the lens module and the image plane, in a case that the camera is out of focus with the first chart.

6. The method of claim 5, wherein the determining of whether the camera is focused on the first chart comprises determining whether a contrast of the image data is maximized.

7. The method of claim 4, wherein the blur calculated through the CoC model is a first diameter of a blur circle, calculated by performing an operation on the first distance, the second distance and the focal distance of the lens module.

8. The method of claim 7, wherein the measuring of the blur comprises:

extracting a blur circle from image data of the camera having imaged the second chart; and measuring a second diameter of the extracted blur circle.

9. The method of claim 8, wherein the evaluating of the PDR of the camera comprises calculating a second phase difference by dividing the second diameter corresponding to the measured blur by a width of each of the pixels.

10. The method of claim 9, wherein the evaluating of the PDR of the camera further comprises calculating a second PDR based on the second phase difference.

11. The method of claim 10, wherein the evaluating of the PDR of the camera further comprises evaluating the PDR of the camera according to a comparison result between a first PDR calculated from the first diameter and the second PDR.

12. The method of claim 11, wherein the first PDR is calculated based on a first phase difference calculated by dividing the first diameter by the width of each of the pixels.

13. The method of claim 1, wherein the first chart is any one of a spatial frequency response (SFR) chart, an edge SFR chart, a line chart, and a television (TV) lines chart.

14. The method of claim 1, wherein the second chart is any one of a diamond chart, a vine chart, a stripe chart, and a checker chart.

15. A camera testing device comprising:

a first chart structured to provide a first scene for testing and disposed to have a first distance from a camera;

a second chart structured to provide a second scene for testing and disposed to have a second distance from the camera; and a camera tester configured to: set the camera to align the camera and the first chart such that the camera is focused on the first chart; measure a blur for the second chart; and evaluate a phase difference range (PDR) of the camera by comparing the measured blur with a blur calculated through a circle of confusion (CoC) model, wherein the PDR indicates a range from a minimum phase difference to a maximum phase difference.

16. The camera testing device of claim 15, wherein the first distance is an infinity distance, and the second distance is a macro distance, and wherein the first distance has a larger value than the second distance.

17. The camera testing device of claim 15, wherein the blur for the second chart is measured by: extracting a blur circle from image data of the camera having imaged the second chart; and measuring a second diameter of the extracted blur circle.

18. The camera testing device of claim 17, wherein the PDR of the camera is evaluated by calculating a second phase difference by dividing the second diameter corresponding to the measured blur by a width of each of image sensing pixels in the camera.

19. The camera testing device of claim 18, wherein the PDR of the camera is further evaluated by calculating a second PDR based on the second phase difference.

20. The camera testing device of claim 15, wherein the first chart is any one of a spatial frequency response (SFR) chart, an edge SFR chart, a line chart, and a television (TV) lines chart, and the second chart is any one of a diamond chart, a vine chart, a stripe chart, and a checker chart.

* * * * *